Patented Mar. 31, 1942

2,277,735

UNITED STATES PATENT OFFICE 2,277,735

REFRACTORY COMPOSITION

Eugene Wainer and Harold D. Prior, Niagara Falls, N. Y., assignors to The Titanium Alloy Manufacturing Company, New York, N. Y., a corporation of Maine No Drawing. Application December 2, 1940, Serial No. 368,222

2 Claims. (Cl. 106—57)

This invention relates to zircon refractory compositions and the method of making such compositions. More particularly, it relates to such compositions which are fluid and moldable by slip casting or slop molding procedures.

In copending application of Kinzie and Wainer, Serial No. 315,595, filed January 25, 1940, there is described a method and composition whereby it has been made possible, for the first time, to make zircon refractory ware by slip casting or slop molding procedures. This is accomplished by adding to the composition certain agents capable or precipitating calcium and aluminum ions. Among these agents are oxalic acid and certain alkali metal pyrophosphates. These agents may be used either alone or together, and may be used in conjunction with other materials for imparting other characteristics to the finished refractory. Among such materials are sodium silicofluoride, calcium zirconium silicate, and Portland cement. We have now found that an ideal composition for slip casting or slop molding zircon refractories, with even smaller quantities of oxalic acid and tetrasodium pyrophosphate than the minimum hitherto thought desirable, can be provided by including in such a composition a certain amount of free silica.

The free silica may be added dry to the composition, or may exist as an impurity in the commercial zircon used as the main ingredient of the composition. To effect this result, the quantities of silica and the other ingredients should be closely controlled and should fall within the following limits, per 100 parts of zircon by weight:

| | Parts by weight |
|---|---|
| Sodium silicofluoride | 0.010 to 0.014 |
| Calcium zirconium silicate | 0.4 to 0.6 |
| Oxalic acid | .007 to 0.009 |
| Tetrasodium pyrophosphate | 0.015 to 0.019 |
| Portland cement | 0.015 to 0.019 |
| Silica | 1.7 to 2.3 |

The zircon and silica, the principal ingredients of the composition, should be finely-divided. As the natural materials are of a coarse granular structure, they must be ground or milled to attain this condition. The zircon and silica should be ground or milled together, such as by wet-milling in a ball mill. After drying and disintegrating the resulting product, the remaining ingredients are added. The dry composition thus formed is usually sold in commerce in this state. When ready to be employed in slip casting zircon refractories, a suitable quantity of water containing dissolved sodium silicate is added to the dry mixture and the mixture stirred until the required smooth fluid consistency is attained. It is also usually desired to add a binder such as gum arabic or gum tragacanth to secure green strength, particularly when the cast refractory masses are large in size.

The invention having been described, the following specific example is now given: 2046.15 lbs. of zircon and 41.60 lbs. of silica are ground together with a suitable quantity of water in a ball mill, to a fineness of —325 mesh. The ground mixture is then dried and disintegrated. To this dry disintegrated material the following ingredients are added:

| | Pounds |
|---|---|
| Sodium silicofluoride | 0.252 |
| Calcium zirconium silicate | 11.13 |
| Oxalic acid | 0.168 |
| Tetrasodium pyrophosphate | 0.357 |
| White Portland cement | 0.357 |

To this mixture is added 357 lbs. of a 0.1% sodium silicate solution. After stirring to form a smooth fluid, the mixture is poured into molds, allowed to dry, and then removed and fired at an elevated temperature.

When parts are mentioned, parts by weight are understood.

We claim:

1. A composition suitable for forming refractory masses comprising zircon, and 0.010 to 0.014 part of sodium silicofluoride, 0.4 to 0.6 part of calcium zirconium silicate, 0.007 to 0.009 part of oxalic acid, 0.015 to 0.019 part of tetrasodium pyrophosphate, 0.015 to 0.019 part of Portland cement, and 1.7 to 2.3 parts of silica per 100 parts of zircon.

2. A composition suitable for forming refractory masses comprising approximately .25 part of sodium silicofluoride, 11 parts of calcium zirconium silicate, 0.17 part of oxalic acid, 0.36 part of tetrasodium pyrophosphate, 0.36 part of white Portland cement, 2046 parts of zircon, and 42 parts of silica.

EUGENE WAINER.
HAROLD D. PRIOR.